United States Patent [19]
Shiga et al.

[11] Patent Number: 6,093,984
[45] Date of Patent: Jul. 25, 2000

[54] ROTOR FOR ELECTRIC MOTOR

[75] Inventors: Tsuyoshi Shiga, Nagoya; Kinya Hayashi, Toki; Masami Endou, Handa, all of Japan

[73] Assignee: Kabushiki Kaisha Toshiba, Kawasaki, Japan

[21] Appl. No.: 09/377,742

[22] Filed: Aug. 20, 1999

[30] Foreign Application Priority Data

Aug. 21, 1998 [JP] Japan .................................. 10-235680

[51] Int. Cl.[7] .................................................. H02K 1/22
[52] U.S. Cl. .............................................. 310/26; 310/156
[58] Field of Search .................................. 310/156, 152, 310/154, 181, 46, 80, 103, 261; 318/41

[56] References Cited

U.S. PATENT DOCUMENTS

| | | | |
|---|---|---|---|
| 5,343,104 | 8/1994 | Takahashi et al. ........................ | 310/90 |
| 5,363,003 | 11/1994 | Harada et al. ........................ | 310/67 R |
| 5,610,464 | 3/1997 | Asano et al. ............................ | 310/156 |
| 5,679,997 | 10/1997 | Matsuzawa et al. ..................... | 310/254 |
| 5,767,601 | 6/1998 | Uchiyama ................................. | 310/190 |
| 5,907,206 | 5/1999 | Shiga et al. .............................. | 310/156 |

Primary Examiner—Nestor Ramirez
Assistant Examiner—Joseph Waks
Attorney, Agent, or Firm—Pillsbury Madison & Sutro LLP

[57] ABSTRACT

A rotor for an electric motor includes a frame made of a resin and having a cylindrical yoke mounting portion, a base covering one end side of the yoke mounting portion, and a shaft supporting portion located at the center of rotation of the base, all of which are formed integrally with the frame, a rotor yoke mounted on the yoke mounting portion and substantially divided into a plurality of unit yokes, and a plurality of rotor magnets mounted on the yoke mounting portion along the rotor yoke.

17 Claims, 13 Drawing Sheets

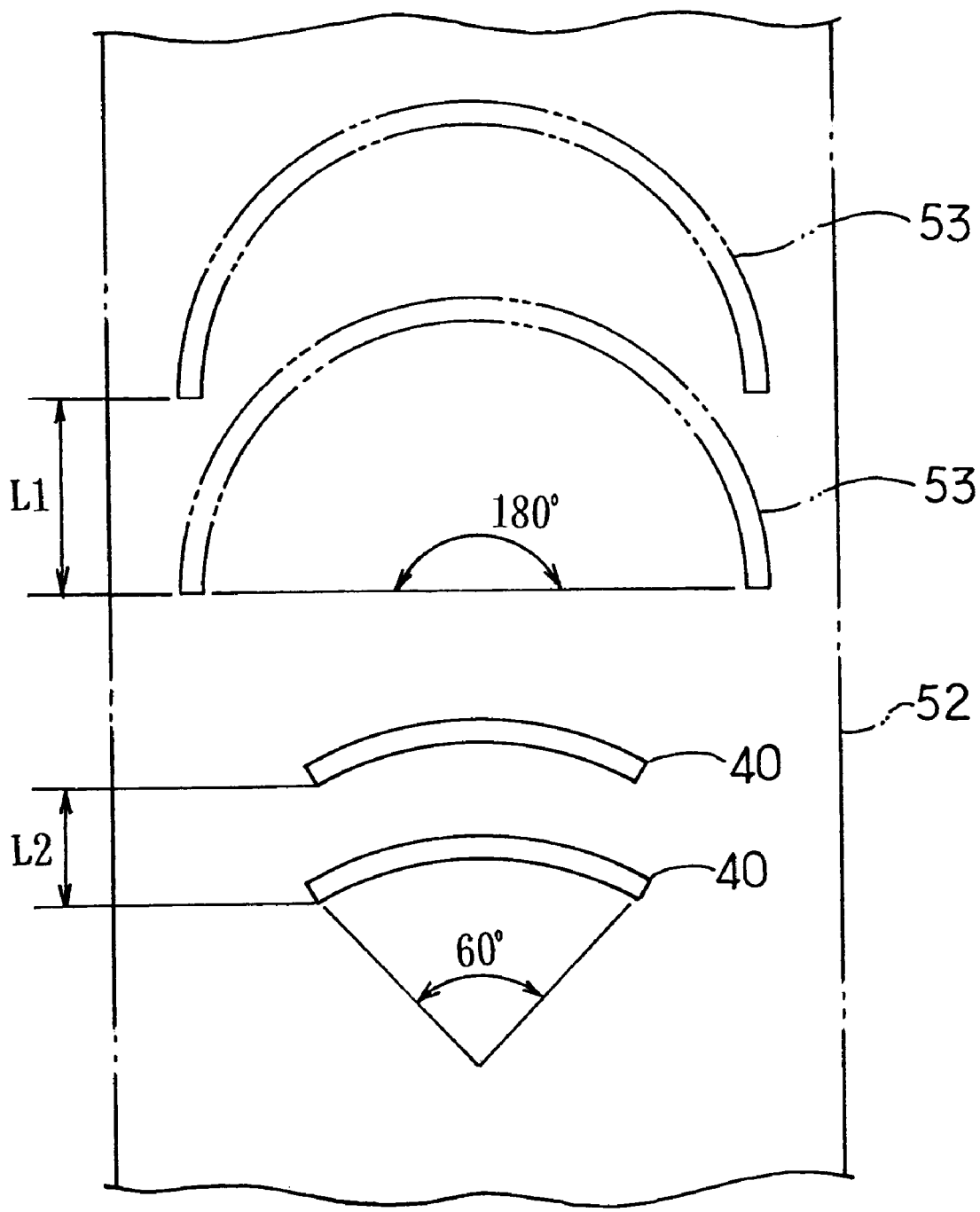
F I G. 6

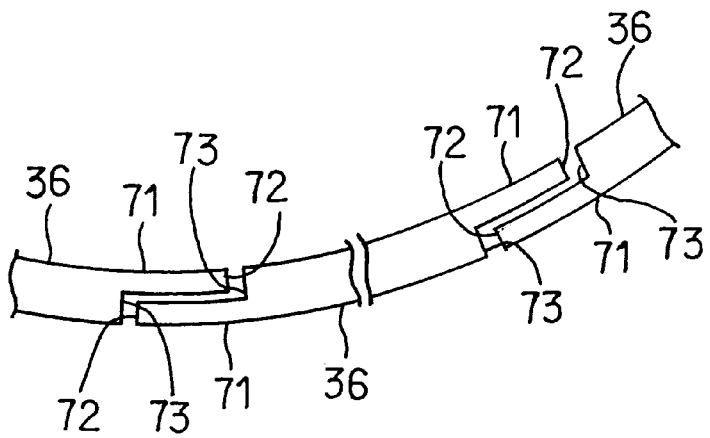
F I G. 1 7
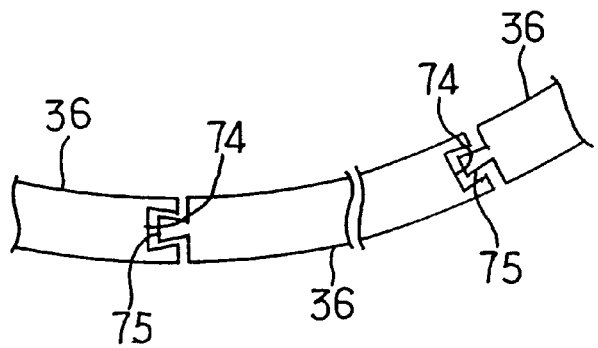
F I G. 1 8
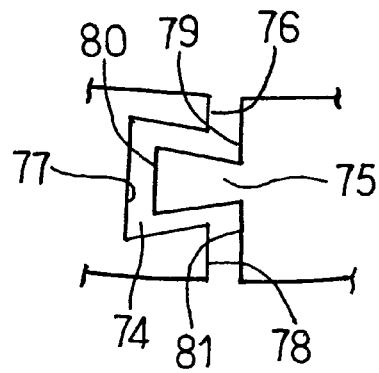
F I G. 1 9

ROTOR FOR ELECTRIC MOTOR

BACKGROUND OF THE INVENTION

1. Field of the Invention

This invention relates to a rotor for electric motors, and more particularly to such a rotor provided with a frame molded from a resin for holding a rotor yoke on which rotor magnets are disposed.

2. Description of the Prior Art

Japanese Patent Publication No. 2-211046A (1990) discloses a rotor of the above-described type. FIG. 22 shows the disclosed rotor. The rotor comprises a frame 1 made of a synthetic resin by way of the injection molding. The frame 1 comprises a cylindrical yoke mounting portion 2 and a base or thin sheet portion 3 having a generally V-shaped section. The thin sheet portion 3 includes a integrally formed cylindrical shaft supporting portion 4. A rotational shaft 5 of the rotor is inserted through the shaft supporting portion 4 to be supported.

An annular rotor yoke 6 and a plurality of rotor magnets 7 are mounted on the yoke mounting portion 2. The rotor yoke 6 and the rotor magnets 7 are accommodated in a molding die assembly and a molten resin is then poured into the die assembly so that the rotor yoke 6 and the rotor magnets 7 are integrated with the frame 1. The rotor yoke 6 is made by roll ingands-tacking band steel sheets.

In the above-described construction, the rotor yoke 6 is subjected heat during the injection molding of the frame 1 so that the rotor yoke is deformed in the direction of arrow A in FIG. 22 or in such a direction that the diameter thereof is increased. On the other hand, the diameter of the rotor yoke 6 is reduced in the direction of arrow B opposite arrow A during the cooling of the frame 1 subsequent to the molding. As the results of these deformations and further a difference between heat shrinkage rates of the rotor yoke 6 and the frame 1, the thin sheet portion 3 is subjected to stress during the cooling subsequent to the molding, whereupon the shaft supporting portion 4 is axially deformed. Although the molding die assembly is designed so as to cope with the deformation of the shaft supporting portion 4, the deformation is unstable and accordingly, a sufficient dimensional accuracy cannot be achieved. With this, since the stress produced during the shrinkage and expansion of the thin sheet portion 3 remains alive, cracks etc. tend to occur.

SUMMARY OF THE INVENTION

Therefore, an object of the present invention is to provide a rotor for electric motors, in which occurrence of cracks can be prevented from being produced in the frame body and the dimensional accuracy of the shaft supporting portion can be rendered stable.

The present invention provides a rotor for an electric motor, comprising a frame made of a resin and having a cylindrical yoke mounting portion, a base covering one end side of the yoke mounting portion, and a shaft supporting portion located at the center of rotation of the base, the yoke mounting portion, the base and the shaft supporting portion being formed integrally with the frame, a rotor yoke provided on the yoke mounting portion and substantially divided into a plurality of unit yokes, and a plurality of rotor magnets provided on the yoke mounting portion along the rotor yoke.

According to the above-described rotor, the rotor yoke is divided into a plurality of the unit yokes completely or incompletely, for example, by slits. Accordingly, expansion and shrinkage of the rotor yoke are circumferentially dispersed at divided portions when the frame is molded from the resin. Since this reduces an amount of stress exerted on the base of the frame, occurrence of cracks due to the residual stress is prevented in the base. Further, since the shaft supporting portion is prevented from displacement, the dimensional accuracy of the shaft supporting portion can be rendered stable.

The number of the unit yokes is preferably equal to that of divisors obtained by dividing the number of teeth of a stator by the number of phases of stator coils, the divisors excluding 1. In this construction, spaces between the adjacent ends of all the unit yokes are simultaneously opposed to the teeth of the stator or to slots defined between the teeth during rotation of the rotor. Consequently, since the rotor magnets develop uniform torque, nonuniformity in the rotation of the rotor can be reduced.

Each unit yoke preferably has two circumferential ends each of which is adjacent to each one circumferential end of the neighboring unit yokes with a space therebetween, and the rotor magnets preferably include those each of which has a circumferential central portion opposed to the space between the adjacent ends of the unit yokes. Since this construction prevents a flow of magnetic flux from being cut or divided at the gaps between the adjacent ends of the unit yokes, the magnetic property can be improved.

The rotor yoke preferably has slits substantially dividing it into a plurality of the unit yokes. In this construction, the unit yokes are preliminarily connected together and accordingly, the unit yokes can readily be accommodated into a molding die.

Each unit yoke is preferably formed by mechanically connecting a plurality of axially stacked magnetic sheets. In this construction, the unit yokes can be machined more easily as compared with a case where thick magnetic plates are rolled into the shape of an arc. Consequently, the circularity of the rotor yoke can be improved.

Each magnetic sheet preferably has a connecting portion opposed to a circumferential central portion of the rotor magnet. Consequently, flows of magnetic flux can be prevented from being obstructed by the connecting portion.

Each unit yoke preferably has two circumferential end faces each of which includes a plurality of divided faces and at least one stepped portion. Since a contact area of the circumferential end faces of each unit yoke with the frame is increased, a mechanical strength of the rotor yoke can be improved.

Each unit yoke preferably has two circumferential ends each of which is formed with a notch having an open axial end and an open circumferential end. Each unit yoke is held at the notches by a pair of jigs to be accommodated into the molding die. Consequently, the unit yokes can readily be accommodated into the molding die.

The frame has a window through which a surface of each unit yoke is exposed outward. The molding die is provided with a positioning portion corresponding to the window. The surface of the unit yoke is brought into contact with the positioning portion of the molding die so that the unit yoke is radially positioned. Consequently, since the positional relation between the molding die and the unit yokes is rendered stable, the circularity of the rotor yoke can be improved.

Each magnetic sheet preferably includes an outer larger diameter portion having a larger outer diameter than the other outer circumferential face thereof, and the magnetic sheets are caulked at the outer larger diameter portions.

Consequently, magnetic paths can be secured around caulked portions.

Each magnetic sheet preferably includes an inner larger diameter portion having a larger inner diameter than the other inner circumferential face before the magnetic sheets are caulked, and the magnetic sheets are preferably caulked at the inner larger diameter portions. The inner larger diameter portions are expanded inside when the magnetic sheets are caulked at the inner larger diameter portions. However, an inner circumferential face of the inner larger diameter portion can be prevented from projecting to the inner circumferential side relative to the other portion of the inner circumferential face. Consequently, the rotor magnets can be prevented from being displaced to the inner circumferential side when mounted on the inner circumferential side face of the inner larger diameter portion.

Each unit yoke preferably has two circumferential ends each of which overlaps one of the circumferential ends of the adjacent unit yokes. The overlapping portions can prevent the magnetic flux from being cut or divided between the unit yokes.

Each unit yoke preferably has two circumferential ends formed with a convex portion and a concave portion respectively, and the convex and concave portions of each unit yoke are preferably engaged with the concave and convex portions of the respective adjacent unit yokes when the unit yokes are arranged in a circle so that both circumferential ends of each unit yoke are adjacent to the circumferential ends of the neighboring unit yokes respectively and are radially spread. When a plurality of the unit yokes are spread radially, each unit yoke is engaged with the circumferentially adjacent unit yokes, so that the unit yokes are held in the spread-diameter state. Consequently, the unit yokes in a preliminary connected state can easily be accommodated into the molding die for the frame.

Each unit yoke preferably has two circumferential ends having notches in upper or lower edges respectively. An axially open space having a large width is formed in the ends of the adjacent unit yokes. The circumferential end faces of the unit yokes are held through the gap by a pair of jigs from the axial one end side so that the unit yokes are accommodated into the molding die. Consequently, the unit yokes can readily be accommodated into the molding die.

BRIEF DESCRIPTION OF THE DRAWINGS

Other objects, features and advantages of the present invention will become clear upon reviewing the following description of the preferred embodiments, made with reference to the accompanying drawings, in which:

FIG. 6 is a plan view of a steel sheet, explaining a punching manner;

FIG. 17 is a partial plan view of a rotor yoke of the rotor of a ninth embodiment in accordance with the invention;

FIG. 18 is a view similar to FIG. 17, showing the rotor yoke of the rotor of a tenth embodiment in accordance with the invention;

FIG. 19 is a partially enlarged view of the rotor yoke in FIG. 18;

DETAILED DESCRIPTION OF THE PREFERRED EMBODIMENTS

Figure 1:
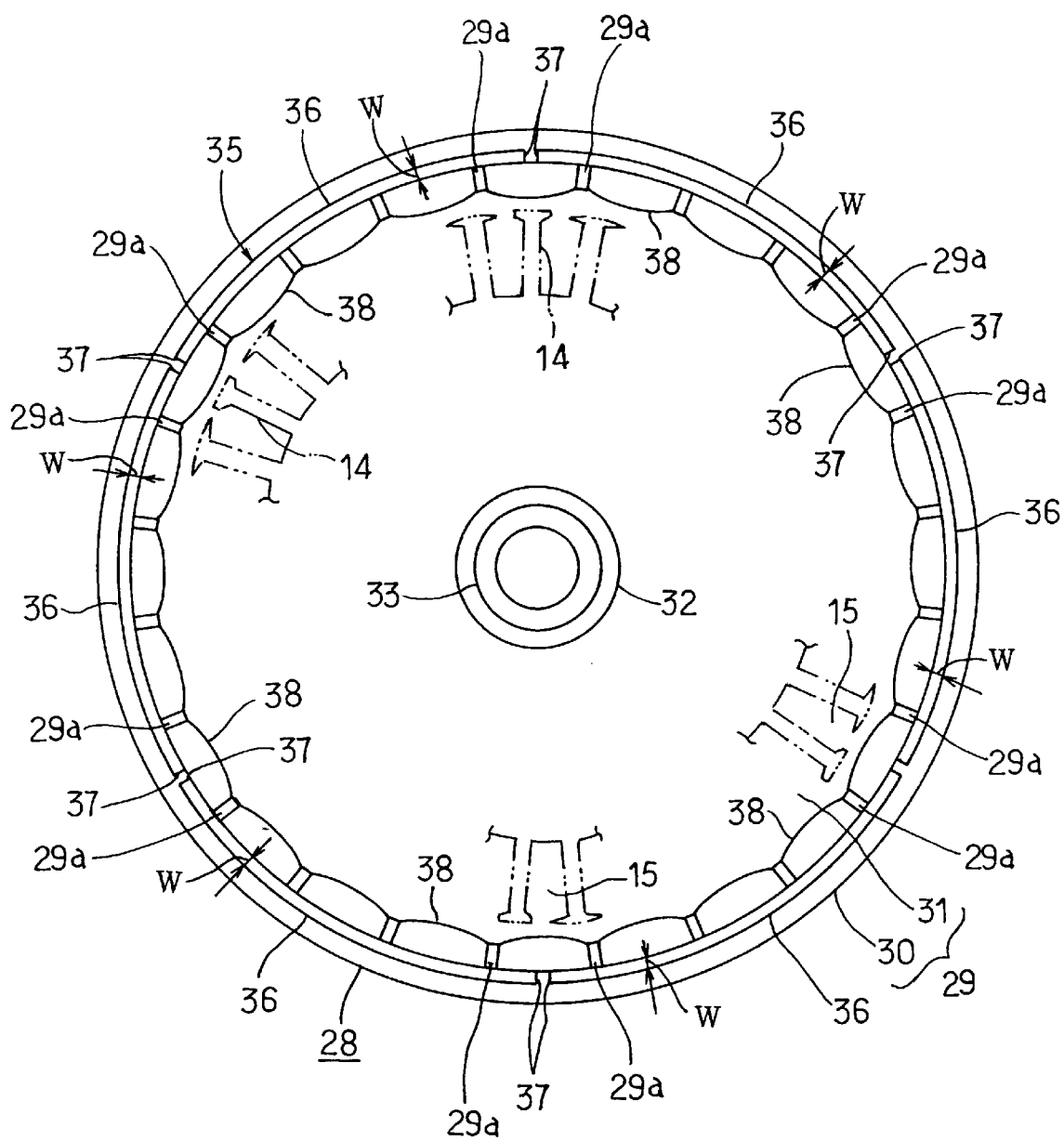
FIG. 1 is a plan view of a rotor for an electric motor of a first embodiment in accordance with the present invention.

A first embodiment of the present invention will be described with reference to FIGS. 1 to 7. In the embodiment, the invention is applied to a three-phase brushless DC motor of the outer rotor type in which a rotor is disposed outside a stator. Referring first to FIG. 3, a stator core 11 of the brushless DC motor is shown. The stator core 11 comprises six unit cores 12 each of which includes an arc-shaped yoke 13 and six generally T-shaped teeth 14. Reference numeral 15 designates slots each of which is defined by the teeth 14 adjacent to each other. Each unit core 12 has two circumferential ends with respect to the yoke 13, the ends being formed with a convex portion 16 and a concave portion 17 respectively. The convex portion 16 of each unit core 12 is forced into the concave portion 17 of the adjacent unit core 12 so that the six unit cores 12 are connected together mechanically and magnetically. Each unit core 12 is made by axially stacking a plurality of steel sheets (not shown).

Figure 2:
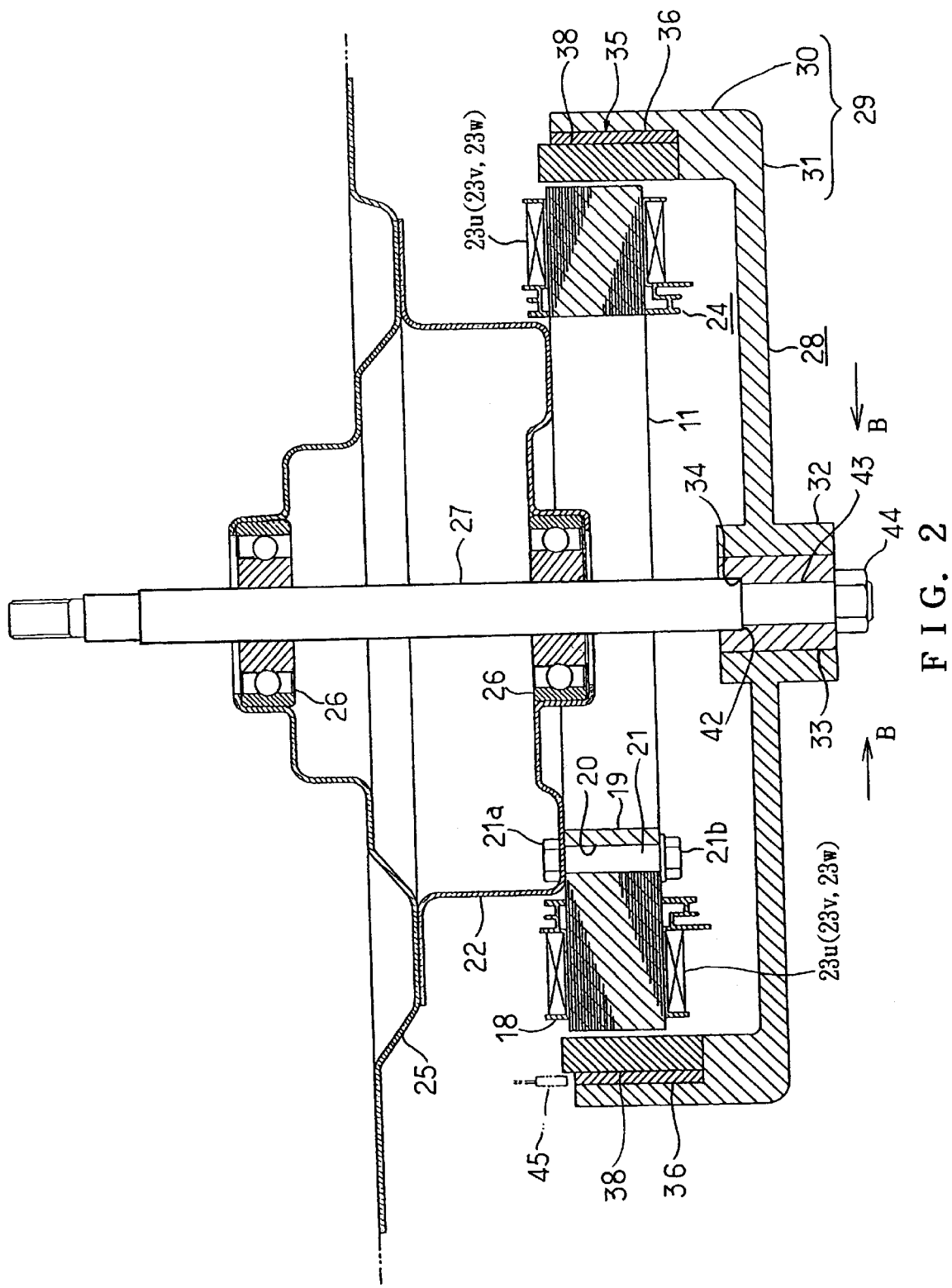
FIG. 2 is a longitudinal section of the motor.
Figure 3:
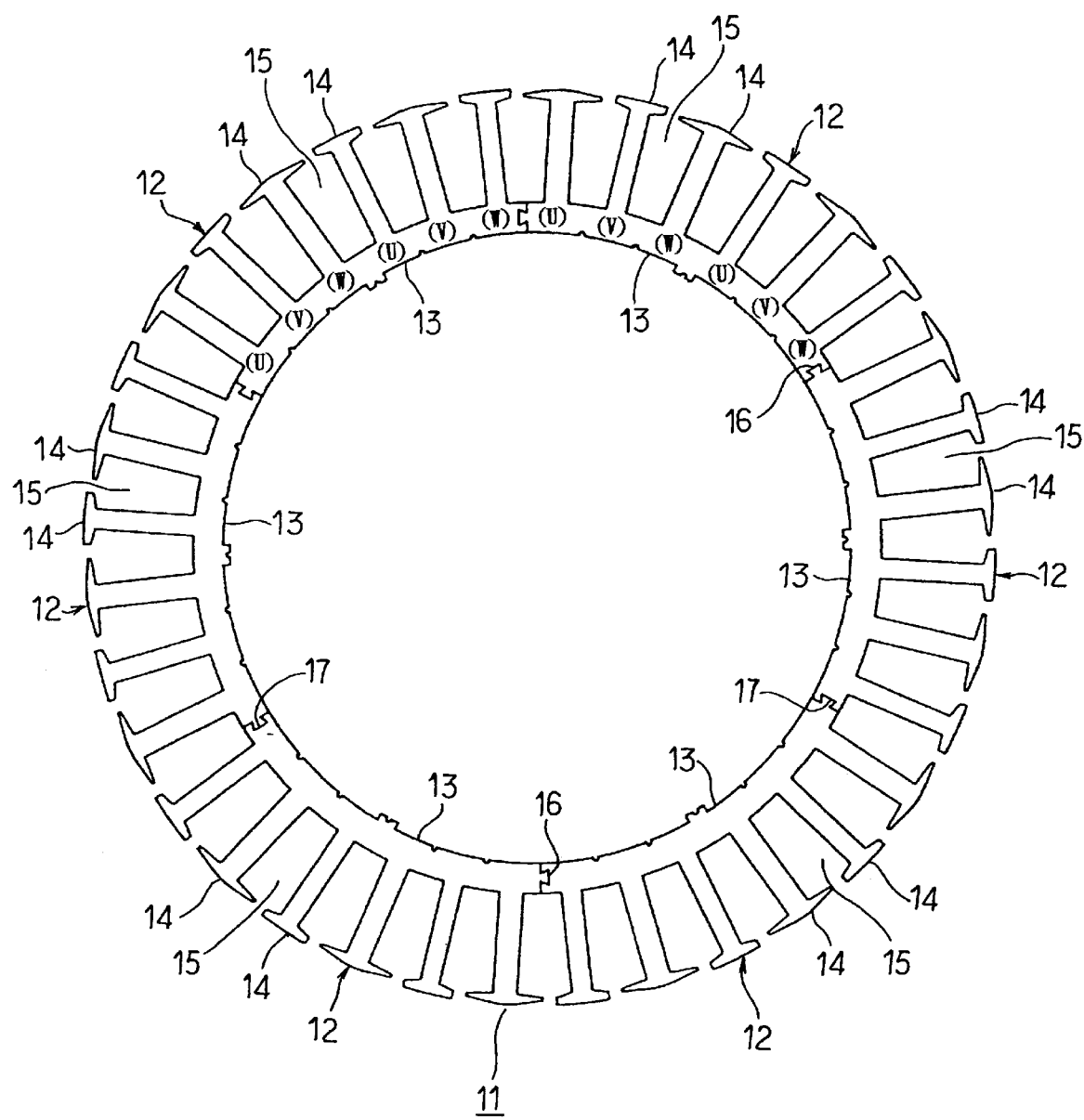
FIG. 3 is a plan view of a stator core of the motor.

A thin plate-shaped molded layer 18 molded from a synthetic resin is formed on the surface of the stator core 11 as shown in FIG. 2. The stator core 11 is accommodated in a molding die assembly and a molten resin is then poured into the die assembly so that the molded layer 18 is formed. The molded layer 18 has a plurality of mounting pieces 19 integrally formed on an inner circumferential portion thereof at equal spaces. One of the mounting pieces 19 is shown. The mounting pieces 19 are formed with through holes 20 through which bolts 21 are inserted from the axially lower end side, respectively.

A first base 22 has an upper opening and is formed into the shape of a receptacle. An upper end of each bolt 21 extends through the bottom of the first base 22, projecting into the interior of the first base 22. Nuts 21a are engaged with the upper ends of the bolts 21 respectively. The mounting pieces 19 and the base 22 are clamped between heads 21b of the bolts 21 and the nuts 21a so that the stator core 11 is fixed to the bottom of the base 22. Twelve phase U coils 23u, twelve phase V coils 23v, and twelve phase W coils 23w are mounted on the molded layer 18 further mounted on the stator core 11. The twelve coils per phase are formed by continuously winding a single magnet wire onto the twelve teeth 14. The coils are arranged regularly in the order of the phase U, V and W coils 23u, 23v and 23w, as shown by parenthesized alphabets in FIG. 3. Reference numeral 24 in FIG. 2 designates a stator 24 comprising the stator core 11 and the coils 23u, 23v and 23w wound on the stator core.

The first base 22 is fixed to a second base 25 as shown in FIG. 2. Two bearings 26 have outer rings fixed to the first and second bases 22 and 25 respectively. A rotational shaft 27 extends through inner rings of the respective bearings 26. The rotational shaft 27 has a lower end to which a rotor 28 is fixed.

The rotor 28 will now be described in detail. A frame 29 of the rotor 28 is made of a synthetic resin by means of the injection molding and includes a cylindrical yoke mounting portion 30 and a flat base 31 continuous to the yoke mounting portion 30. The base 31 has a cylindrical resin boss 32 formed integrally in the center thereof. The boss 32 serves as a shaft supporting portion. A cylindrical boss body 33 is fitted in the boss 32. The boss body 33 is made of a metal and has a stepped portion 34 formed on an inner circumferential face thereof.

Figure 5:
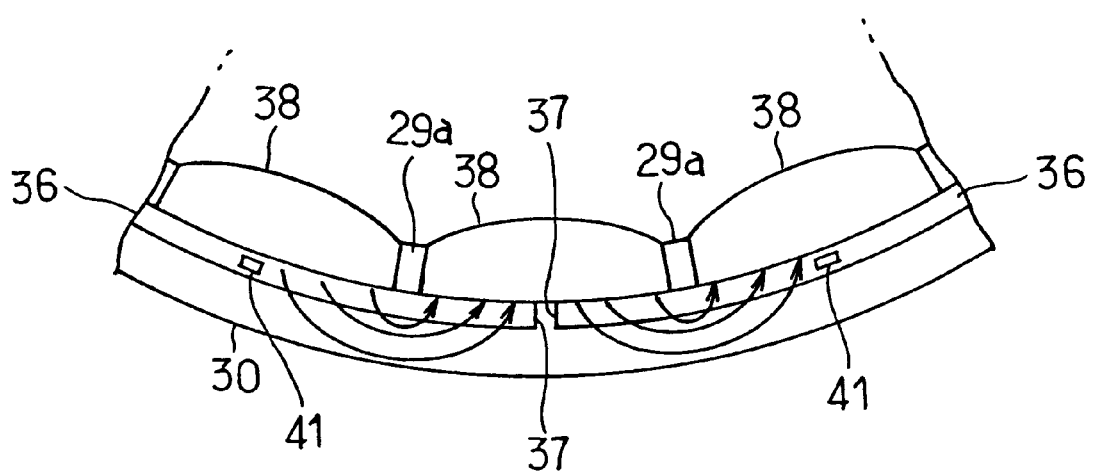
FIG. 5 is a partially enlarged plan view of the rotor.

A cylindrical rotor yoke 35 is mounted on the yoke mounting portion 30. The rotor yoke 35 comprises six divided arc-shaped unit yokes 36 having the same radial width as shown in FIG. 1. Each unit yoke 36 has two straight circumferential end faces or divided faces 37 as shown in FIG. 5. A space is defined between the divided faces 37 adjacent to each other. Twenty-four rotor magnets 38 are mounted on the inner circumferential face of the rotor yoke 35 at the pitch of 15 degrees as shown in FIG. 1. The rotor magnets 38 include six ones each of which has a circumferential central portion opposed to the space between the divided faces 37 of the unit yokes 36 adjacent to each other. The rotor magnets 38 are connected by connecting portions 29a formed integrally with the yoke mounting portion 30 of the frame 29 in a circle. An outer circumferential face of each rotor magnet 38 is adherent closely to the inner circumferential face of the unit yoke 36 so that each rotor magnet 38 is magnetically connected to the unit yoke.

Figure 4:
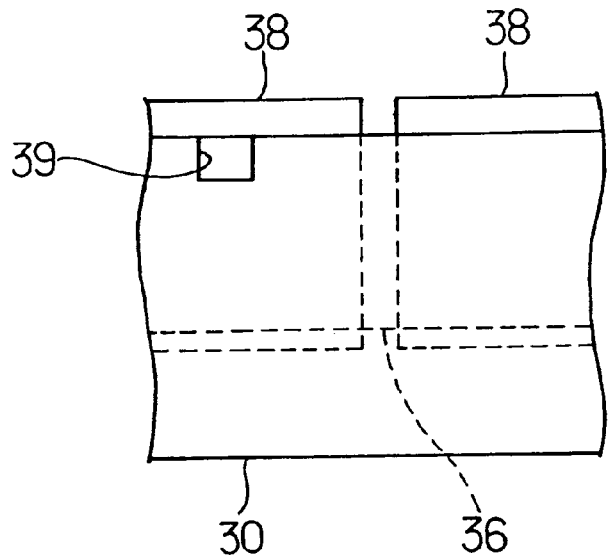
FIG. 4 is a partially enlarged side view of the rotor.

The yoke mounting portion 30 of the rotor 28 has rectangular windows 39 formed to correspond to each circumferential end of each unit yoke 36 as shown in FIG. 4. A part of the outer circumferential face of the unit yoke 36 is exposed through each window 39. Each unit yoke 36 is made by stacking a plurality of steel sheets 40 (see FIG. 6) axially with respect to the rotor. The axially stacked steel sheets 40 are caulked at portions corresponding to the circumferential central portions of the rotor magnets 38 as shown by reference numeral 41 in FIG. 5, so that the steel sheets 40 are mechanically connected together. The steel sheet 40 serves as a magnetic sheet, and each caulked portion 41 serves as a connected portion. The rotational shaft 27 has a stepped portion 42 and a threaded small diameter portion 43 extending from the stepped portion. The threaded portion 43 of the shaft 27 is inserted through the boss body 33 and a nut 44 is then engaged with the threaded portion 43 so that the boss body 33 is clamped between the stepped portion 42 and the nut 44, whereby the rotor 28 is fixed to the shaft 27 so as to be rotated together.

The phase U coils 23u, the phase V coils 23v and the phase W coils 23w are connected via an inverter main circuit (not shown) to a direct-current power supply (not shown). The inverter main circuit comprises six switching elements (not shown) connected into a three-phase bridge configuration. When a PWM signal is supplied to the inverter main circuit for the switching control, a driving power is supplied to each of the coils 23u, 23v and 23w so that the rotor 28 is rotated. A Hall element 45 serving as a magnetic sensor is disposed so as to be opposed to an axial upper end of the rotor yoke 35 as shown in FIG. 2. When each rotor magnet 38 is opposed to the Hall element 45 upon rotation of the rotor 28, the Hall element delivers a magnet detection signal. Phases of the PWM signals supplied to the respective phases U, V and W are shifted on the basis of the magnet detection signal so that a switching timing of the inverter main circuit is set.

Figure 7:
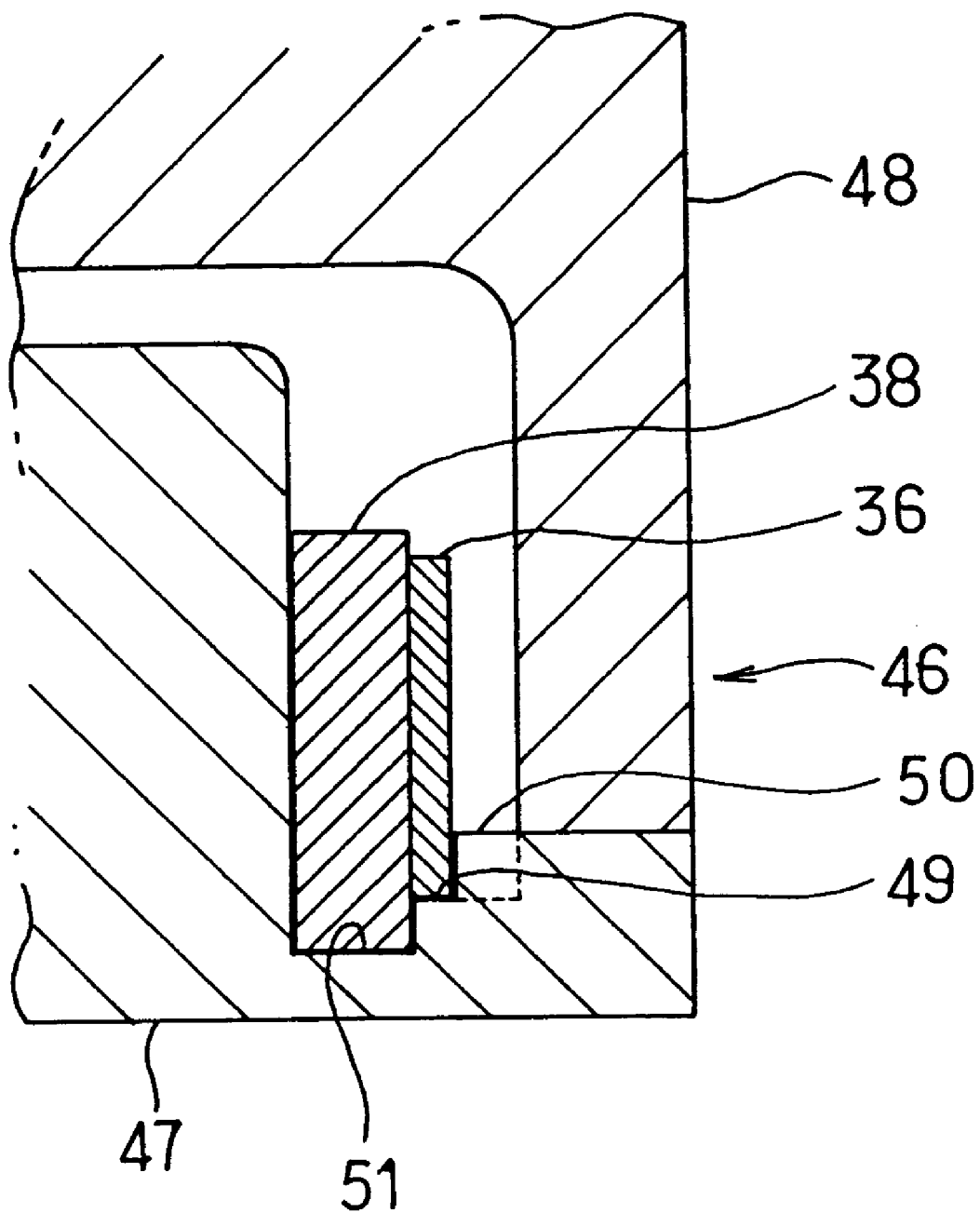
FIG. 7 is a partially longitudinal section of a die assembly used for molding a frame.

FIG. 7 shows a molding die assembly 46 used for molding the frame 29. The die assembly 46 includes a fixed die 47 and a moving die 48. The fixed contact 47 is formed with an annular stepped yoke setting portion 49. The unit yokes 36 are set on the yoke setting portion 49 so as to be axially positioned. The fixed die 47 is formed with protrusion-like yoke positioning portions 50 corresponding to the circumferential ends of the units yokes 36 respectively. The yoke positioning portions 50 are provided for forming the windows 39 shown in FIG. 4 in the frame 29. The unit yokes 36 are pressed against the yoke positioning portions 50 so as to be axially positioned. The fixed die 47 is further formed with an annular concave magnet setting portion 51. The rotor magnets 38 are axially positioned by inner and outer circumferential faces and the bottom of the magnet setting portion 51.

The procedure for manufacturing the rotor 28 will now be described. Six unit yokes 36 are set on the yoke setting portion 49 of the fixed die 47, and the outer circumferential faces of the unit yokes 36 are pressed against the yoke positioning portions 50. Twenty-four rotor magnets 38 are then fitted into the magnet setting portion 51 of the fixed die 47 and thereafter, the moving die 48 is moved to close the fixed die 47. A predetermined amount of molten resin is then poured into the die assembly 46 so that the frame 29 is formed. Thereafter, the moving die 48 is moved so as to open the fixed die 47, so that the frame 29 is taken out of the die assembly 46. The boss body 33 is fitted into the resin boss 32 of the frame 29.

According to the above-described embodiment, the rotor yoke 35 is divided into the six unit yokes 36. Accordingly, expansion and shrinkage of the rotor yoke 35 are circumferentially dispersed when the frame 29 is molded from the resin. Since this reduces an amount of stress exerted on the base 31 of the frame 29 in the direction of rotation as shown by arrow B in FIG. 2, occurrence of cracks due to the residual stress can be prevented in the base 31. Further, since the resin boss 32 of the frame 29 is prevented from displacement, the dimensional accuracy of the resin boss 32 can be rendered stable.

Further, when the space between the predetermined circumferentially adjacent unit yokes 36 or between the divided faces thereof is opposed to the tooth 14, all the other spaces between the unit yokes 36 are opposed to the teeth 14 respectively, as shown by two-dot chain line in FIG. 1. Moreover, when the space between the predetermined unit yokes 36 circumferentially adjacent to each other is opposed to the slot 15, all the other spaces between the unit yokes 36 are opposed to the slots 15 respectively, as shown by chain line in FIG. 1. Consequently, since a uniform torque is developed by the respective rotor magnets 38, nonuniformity in the rotation of the rotor 28 can be reduced and production of abnormal sound and vibration can be prevented during rotation of the rotor 28.

In a case where the rotor yoke 35 is divided into two unit yokes, a punching pitch L1 between steel sheets 53 is increased when the steel sheets 53 to be stacked are punched out of a band steel 52 as shown by two-dot chain line in FIG. 6. This reduces the yield of the steel sheets 53 and accordingly increases the material cost. In the above-described embodiment, however, the rotor yoke 35 is divided into the six unit yokes 36. Consequently, since the punching pitch L2 between the steel sheets 40 is rendered smaller, the yield can be improved and the material cost can be saved. Further, the circumferential central portion of the rotor magnet 38 is opposed to each space between the circumferentially adjacent unit yokes 36, as shown in FIG. 5. Consequently, magnetic paths from one rotor magnet 38 via the unit yoke 36 to another rotor magnet 38 are not cut or divided by the space as shown by arrows in FIG. 5 and accordingly, the magnetic property can be improved.

Each unit yoke 36 is formed by axially stacking a plurality of the steel sheets 40. Accordingly, the unit yokes can be manufactured more easily as compared with a case where thicker magnetic sheets are rolled into the shape of an arc. Since this improves the circularity of the rotor yoke 35, mechanical nonuniformity in the rotation of the rotor 28 can be reduced. Moreover, the positions of the rotor magnets 38 are rendered stable, and magnetic nonuniformity in the rotation of the rotor 28 is reduced. Consequently, production of abnormal sound and vibration can be prevented during rotation of the rotor 28. Additionally, since the axially stacked steel sheets 40 are insulated from one another, eddy-current loss about the magnetic flux can be prevented and accordingly, the magnetic property can be improved.

The axially stacked steel sheets 40 are caulked so as to be mechanically connected together. Accordingly, the steel sheets 40 can be positioned and caulked when accommodated into the molding die. Since this improves the circularity of the rotor yoke 35, production of abnormal sound and vibration can be prevented during rotation of the rotor 28. Further, the caulked portions 41 of the axially stacked steel sheets 40 are set on the circumferential central portions of the respective rotor magnets 38. Since the flow of the magnetic flux from one rotor magnet 38 via the unit yoke 36 to another rotor magnet 38 is not prevented by the caulked portions 41, as shown by arrows in FIG. 5. Consequently, loss in the magnetic flux by the caulked portions 41 can be prevented and accordingly, the magnetic property can be improved.

Further, the frame 29 is formed with the windows 39 through which the parts of the outer circumferential faces of the unit yokes 36 are exposed outside. Accordingly, the unit yokes 36 are pressed against yoke positioning portions 50 when placed on the yoke setting portion 49 of the fixed die 47, so that the unit yokes 36 can be positioned radially. Consequently, the circularity of the rotor yoke 35 can be improved and production of abnormal sound and vibration can be prevented during rotation of the rotor 28.

Figure 8:
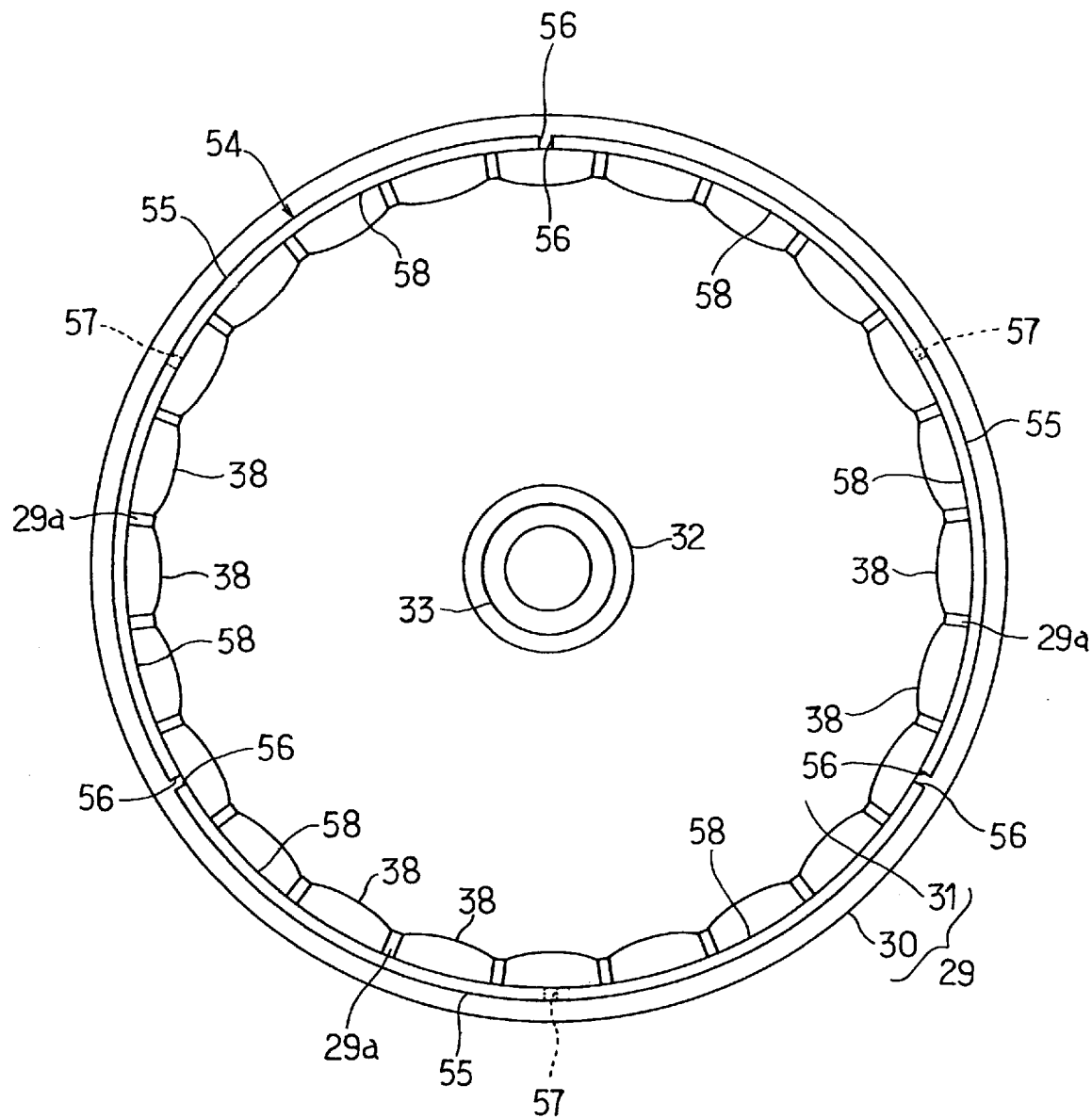
FIG. 8 is a view similar to FIG. 1, showing the rotor of a second embodiment in accordance with the invention.
Figure 9:
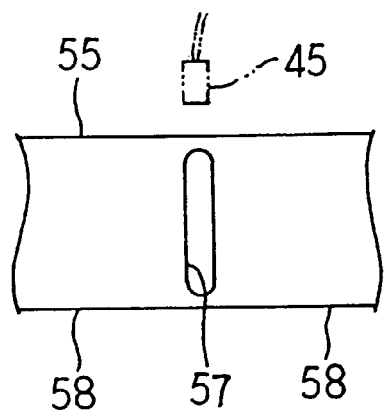
FIG. 9 is a partial side view of a rotor yoke.

FIGS. 8 and 9 illustrate a second embodiment of the invention. In the second embodiment, a cylindrical rotor yoke 54 is mounted on the yoke mounting portion 30 of the frame 29, instead of the rotor yoke 35, as shown in FIG. 8. The rotor yoke 54 comprises three arc-shaped unit yokes 55. Each unit yoke 55 has two straight circumferential end faces or divided faces 56. A space is defined between the divided faces 56 adjacent to each other. Each unit yoke 55 is formed by axially stacking a plurality of steel sheets and caulking the stacked steel sheets. Each unit yoke 55 has a slit 57 formed in the circumferential central portion thereof as shown in FIG. 9 and serving as a dividing portion. The slit 57 substantially divides each unit yoke 55 into two unit yokes 58 and has two closed straight axial ends.

The twenty-four rotor magnets 38 are mounted on the inner circumferential face of the rotor yoke 54 at the pitch of 15 degrees as shown in FIG. 8. The rotor magnets 38 include three ones each of which has a circumferential central portion opposed to the respective slit 57. Other three rotor magnets 38 have circumferential central portions opposed to the spaces between the unit yokes 55 or the divided faces 56 respectively. The three unit yokes 55 and the rotor magnets 38 are accommodated into a molding die assembly 46 as shown in FIG. 7 and the molten resin is poured into the die assembly 46 so that the rotor yoke 54 and the rotor magnets 38 are integrated with the frame 29.

According to the second embodiment, the rotor yoke 54 is formed with a plurality of the slits 57 so that the rotor yoke 54 is substantially divided into a plurality of the unit yokes 58. Consequently, since the unit yokes 58 are mechanically connected via the portion other than the slit 57, a plurality of the unit yokes 58 need not be individually accommodated into the molding assembly 46 and accordingly, the unit yokes 58 can readily be accommodated into the molding die assembly 46.

Further, since the axial upper end of each slit 57 is closed, the closed upper end of each slit 57 is opposed to the Hall element 45 as shown in FIG. 9. The slit 57 would vary the sensitivity of the Hall element 45 if the upper end of the slit should be open, whereupon the switching timing of the inverter main circuit would undesirably be shifted. In the second embodiment, however, this can be prevented and accordingly, the rotation of the rotor 28 can be smoothed.

Figure 10:
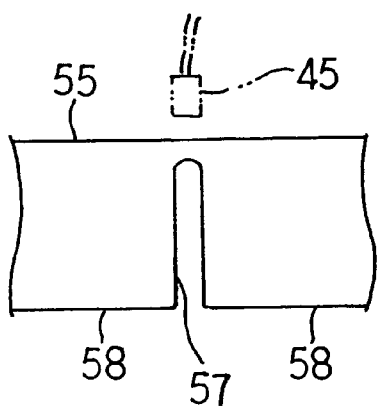
FIG. 10 is a view similar to FIG. 9, showing the rotor of a third embodiment in accordance with the invention.

Although both of the axial ends of each slit 57 are closed in the second embodiment, the axial lower end of each slit may be open and the axial upper end of each slit may be closed as shown as a third embodiment in FIG. 10.

In the second and third embodiments, a plurality of slits 57 may be formed in a cylindrical rotor yoke at a regular pitch so that the rotor yoke is divided into the unit yokes the number of which is equal to that of the slits 57. In this construction, too, when the frame 29 is molded from the resin, the expansion and shrinkage of the rotor yoke tend to be circumferentially dispersed more easily as compared with a case where the cylinder yoke is formed with no slits. Consequently, occurrence of cracks due to the residual stress can be prevented in the base 31.

Figure 11:
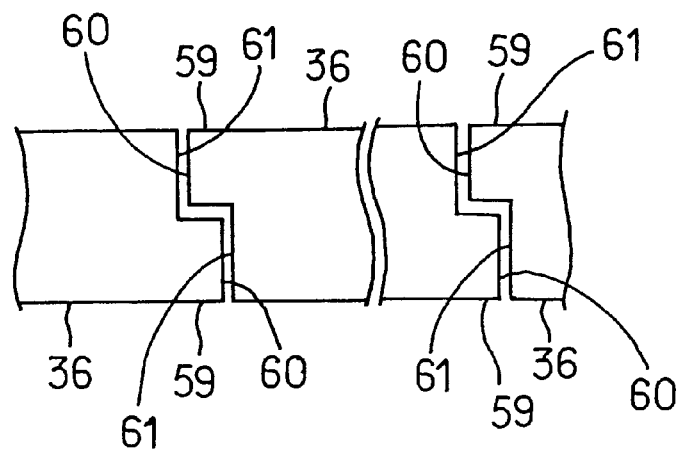
FIG. 11 is a view similar to FIG. 9, showing the rotor of a fourth embodiment in accordance with the invention.

FIG. 11 illustrates a fourth embodiment of the invention. Each unit yoke 36 has on one circumferential end thereof a rectangular piece or protrusion 59 located on the axial upper portion and on the other circumferential end thereof a rectangular piece or protrusion 59 located on the axial lower portion. Thus, both ends of each unit yoke 36 are formed with circumferential steps respectively. Each protrusion 59 provides circumferential displaced straight divided faces 60 and 61 on the unit yoke 36. Spaces are defined between the circumferential opposed divided faces 60 and between circumferentially divided faces 61 respectively. Spaces are further formed between axially opposed rectangular pieces 59.

According to the fourth embodiment, the circumferential end faces of each unit yoke 36 are formed into the divided faces 60 and 61 respectively. Consequently, since a contact area between the circumferential end faces of each unit yoke 36 and the yoke mounting portion 30 of the frame 29 is increased, a holding force of the yoke mounting portion 30 for the unit yokes 36 can be increased and accordingly, the mechanical strength of the rotor 28 can be improved.

Figure 12:
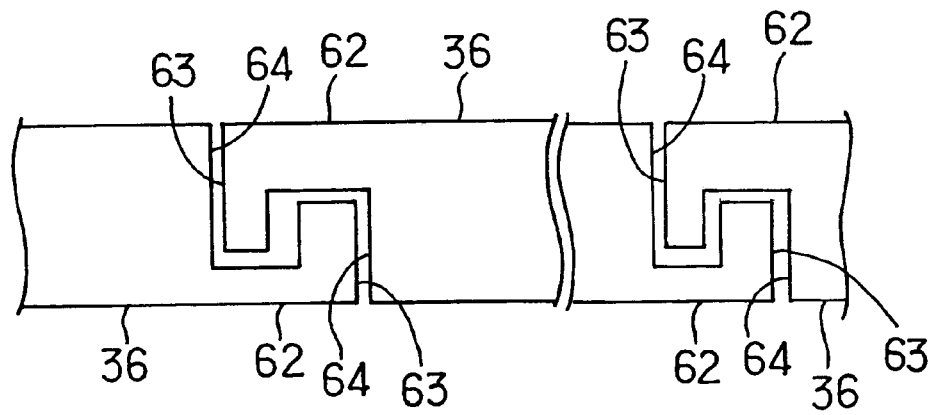
FIG. 12 is a view similar to FIG. 9, showing the rotor of a fifth embodiment in accordance with the invention.

FIG. 12 illustrates a fifth embodiment of the invention. One circumferential end of each unit yoke 36 has a generally L-shaped engagement portion 62 located at the axial upper end thereof. The other circumferential end of each unit yoke 36 also has a generally L-shaped engagement portion 62 located at the axial lower end thereof. These engagement portions 62 form circumferentially displaced straight divided faces 63 and 64. Spaces are defined between the circumferentially opposed divided faces 63 and 64 respectively. Spaces are also defined between the axially opposed engagement portions 62.

According to the fifth embodiment, the circumferential ends of each unit yoke 36 have the respective L-shaped engagement portions 62 forming the divided faces 63 and 64 respectively. Consequently, since the contact area between the circumferential end faces of each unit yoke 36 and the yoke mounting portion 30 of the frame 29 is increased, a holding force of the yoke mounting portion 30 for the unit yokes 36 can be increased and accordingly, the mechanical strength of the rotor 28 can be improved. Further, when the six arc-shaped unit yokes 36 are arranged in a circle so that both circumferential ends of each unit yoke 36 are adjacent to those of the neighboring unit yokes 36 respectively and are radially spread, the circumferentially adjacent engagement portions 62 are engaged with each other, so that the six unit yokes 36 are held in a spread-diameter state. Consequently, since the unit yokes 36 are accommodated into the molding die assembly 46 in a preliminarily connected state, the working efficiency can be improved as compared with a case where the unit yokes 36 are accommodated into the molding die assembly 46 individually.

Figure 13:
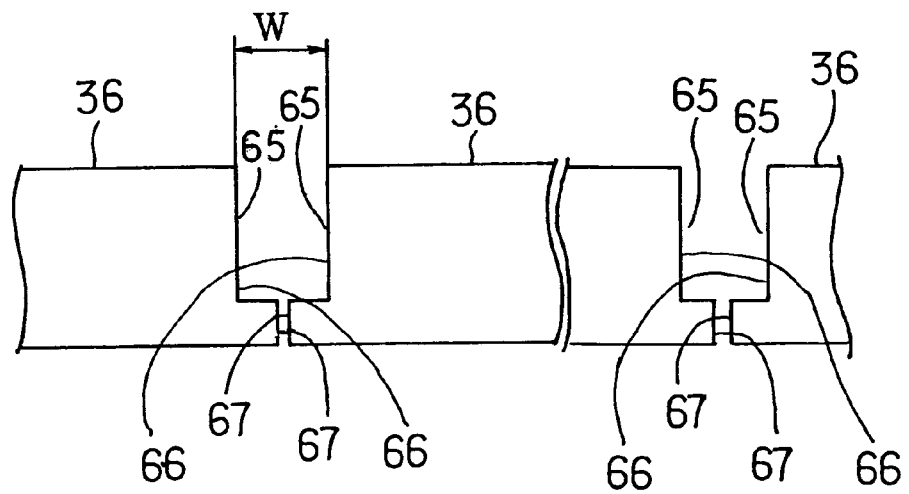
FIG. 13 is a view similar to FIG. 9, showing the rotor of a sixth embodiment in accordance with the invention.
Figure 14:
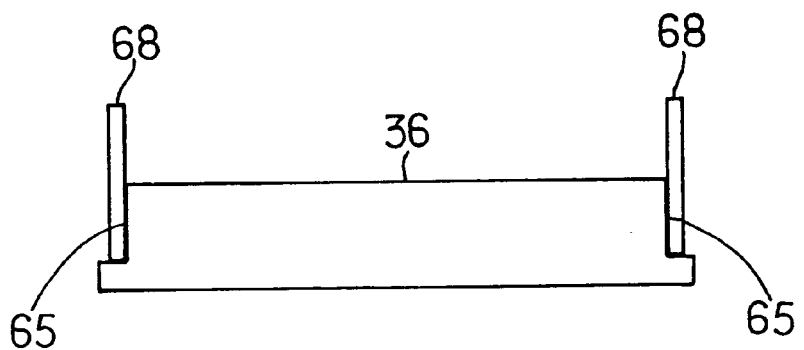
FIG. 14 is a side view of a unit yoke held by jigs.

FIGS. 13 and 14 illustrate a sixth embodiment of the invention. Both circumferential ends of each unit yoke 36 are formed with notches 65 having L-shaped cut ends respectively. The notches 65 form circumferentially displaced divided faces 66 and 67. Spaces are defined between the circumferentially opposed divided faces 66 and 64 respectively. A circumferential width W between the divided faces 66 is set at a predetermined value ranging between 1 to 3 mm.

FIG. 14 shows jigs 68 connected to arms of an industrial robot (not shown). The circumferential end faces of the unit yoke 36 are held by the paired jigs 68, which are then carried by the robot, so that the unit yoke 36 is placed on the yoke setting portion 49.

According to the sixth embodiment, the notches 65 are formed on the circumferential end faces of each unit yoke 36 respectively. Accordingly, each jig 68 is prevented from interfering with the circumferentially adjacent unit yoke 36. Further, since the unit yokes 36 are automatically set on the yoke setting portion 49 by the jigs 68, the working efficiency can be improved when the unit yokes 36 are accommodated into the molding die assembly 46.

Although both circumferential ends of each unit yoke 36 have the respective notches 65 in the sixth embodiment, only one of the circumferential ends may have a notch 65. In this case, the circumferential width of each notch 65 is preferably set at 2W so that each jig 68 is prevented from interfering with the circumferentially adjacent unit yoke 36.

Figure 15:
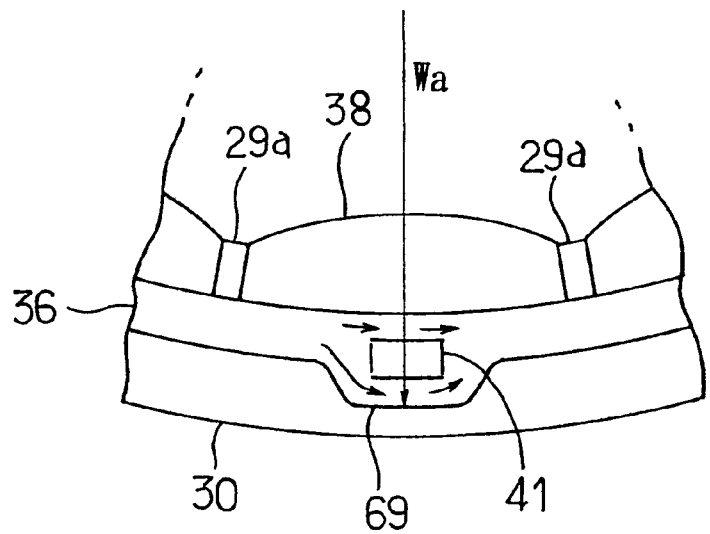
FIG. 15 is a view similar to FIG. 5, showing the rotor of a seventh embodiment in accordance with the invention.

FIG. 15 illustrates a seventh embodiment of the invention. Each unit yoke 36 has wider portions 69 each of which is formed to correspond to the circumferentially central portion of the rotor magnet 38. Each wider portion 69 serves as an outer larger diameter portion having an outer diameter Ra set to be larger than the other outer circumferential face of the unit yoke 36. The axially stacked steel sheets 40 are caulked at the radially and circumferentially central portions of the wider portion 69. Reference numeral 41 designates the caulked portion.

According to the seventh embodiment, each wider portion 69 enlarges the magnetic paths around the caulked portion 41 through which the magnetic flux is hard to flow. Accordingly, since the magnetic flux bypasses the caulked portion as shown by arrows in FIG. 15, the magnetic property can be improved. Moreover, since the radial width of the caulked portion 41 is increased, the mechanical connecting strength of the stacked steel sheets 40 can be increased.

Figure 16:
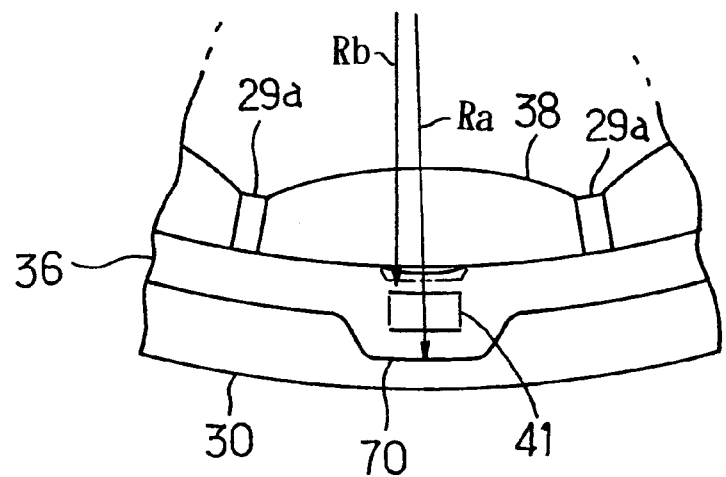
FIG. 16 is a view similar to FIG. 5, showing the rotor of an eighth embodiment in accordance with the invention.

FIG. 16 illustrates an eighth embodiment of the invention. Each unit yoke 36 has an inner larger-diameter portion 70 formed to correspond to the circumferentially central portion of the rotor magnet 38. Each inner larger-diameter portion 70 has an inner diameter Rb larger than the other inner circumferential face of each unit yoke 36 before the caulking as shown by two-dot chain line. An outer diameter Ra is also set to be larger than the other outer circumferential face.

The stacked steel sheets 40 are caulked at the circumferential and radial central portions of each inner larger-diameter portion 70, so that the caulked portion 41 is formed on each inner larger-diameter portion 70. As a result, the inner larger-diameter portion 70 extends to inwardly expand. However, since the pre-caulking inner diameter Rb of the inner larger-diameter portion 70 is set to be larger than the other inner circumferential face, the inner circumferential face of the inner larger-diameter portion 70 is prevented from projecting inward relative to the other portion. Consequently, the rotor magnets 38 can be prevented from being displaced inward and accordingly, the locations of the rotor magnets 38 can be rendered stable. Further, nonuniformity in the rotation of the rotor 28 can be reduced and production of abnormal sound and vibration can be prevented during rotation of the rotor 28.

FIG. 17 illustrates a ninth embodiment of the invention. Both circumferential ends of each unit yoke 36 are formed with inner and outer thin overlapped portions 71 respectively. Each overlapped portion 71 and the circumferentially adjacent one are overlapped to form divided faces 72 and 73 having a difference in level relative to each other. Spaces are defined between the circumferentially opposed divided faces 72 and 73 respectively. Spaces are also defined between the axially opposed overlapped portions 71 respectively.

According to the ninth embodiment, each overlapped portion 71 and the circumferentially adjacent one are overlapped. Consequently, since the magnetic flux is prevented from being completely cut by the space between the circumferentially adjacent unit yokes 36, the magnetic property can be improved.

FIGS. 18 and 19 illustrate a tenth embodiment of the invention. One circumferential end of each unit core 36 is formed with a trapezoidal concave portion 74, whereas the other circumferential end thereof is formed with a trapezoidal protrusion 75. The protrusions 75 are axially inserted into the concave portions 74 so as to radially overlap the inner faces of the concave portions respectively. As shown in FIG. 19, each concave portion 74 provides circumferential divided faces 76 to 78 and each protrusion 75 provides circumferential divided faces 79 to 81. Spaces are defined between the divided faces 76 and 79, the divided faces 77 and 80 and the divided faces 78 and 81 respectively.

According to the tenth embodiment, the protrusion 75 of each unit yoke 36 radially overlaps the inner face of the concave portion 74 of the adjacent unit yoke 36.

Consequently, since this prevents the magnetic flux from being completely cut between the unit yokes 36 circumferentially adjacent to each other, the magnetic property can be improved. Further, when the six arc-shaped unit yokes 36 are arranged in a circle so that both circumferential ends of each unit yoke 36 are adjacent to those of the neighboring unit yokes 36 respectively and are radially spread, the protrusions 75 engage the inner faces of the concave portions 74 respectively, so that the six unit yokes 36 are held in a spread-diameter state. Consequently, since the unit yokes 36 are accommodated into the molding die assembly 46 in a preliminarily connected state, the working efficiency can be improved.

Figure 20:
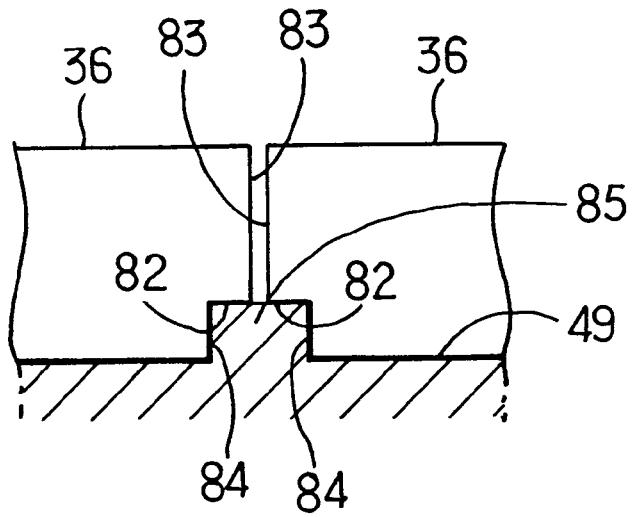
FIG. 20 is a partially longitudinal section of a molding fixed die accommodating the unit yokes of the rotor of an eleventh embodiment in accordance with the invention.

FIG. 20 illustrates an eleventh embodiment of the invention. Both circumferential ends of each unit yoke 36 have rectangular notches 82 located at the lower edges thereof respectively. Each notch 82 provides divided faces 83 and 84 having a difference in level relative to each other. Spaces are defined between the circumferentially opposed divided faces 83 and between the circumferentially opposed divided faces 84 respectively.

According to the eleventh embodiment, a plurality of positioning protrusions 85 are provided on the yoke setting portion 49 of the fixed die 47. When the unit yokes 36 are set on the yoke setting portion 49, the inner faces of the notches 82 are brought into contact with the positioning protrusions 85 so that the unit yokes 36 are circumferentially positioned. Consequently, since the circularity of the rotor yoke 35 is improved and the nonuniformity in the rotation of the rotor 28 can be reduced, the abnormal sound and vibration can be prevented from being produced during rotation of the rotor 28.

The notches 82 are formed in the axially lower edges of the both circumferential ends of each unit yoke 36 respectively in the eleventh embodiment. However, the notches 82 may be formed in the upper edges of both circumferential ends of each unit yoke 36 respectively as shown as a twelfth embodiment in FIG. 21. In this case, a pair of jigs 68 are inserted into the paired notches 82 located at the axially upper side of each unit yoke 36 so that the inner faces of the notches 82 are held by the jigs 68 respectively, whereby the unit yokes 36 are set on the yoke setting portion 49. Consequently, the working efficiency can be improved when the unit yokes 36 are accommodated into the molding die assembly 46.

The rotor yoke 35 is divided into the six unit yokes 36 in the first and third to twelfth embodiments. However, the rotor yoke 35 may be divided into a plurality of unit yokes 36 other than six, instead. The number of unit yokes is preferably determined to be equal to that of divisors obtained by dividing the number of teeth 14 of a stator by the number of phases of the stator coils 23u, 23v and 23w, the divisors excluding 1.

Each unit yoke 36 is formed by stacking a plurality of the steel sheets 40 in the first and third to twelfth embodiments. Each unit yoke 55 is formed by stacking a plurality of the steel sheets in the second embodiment. However, the unit yokes 36 or 55 may be formed by shaping a thick steel material into an arc shape, instead.

The axially stacked steel sheets 40 are caulked to be thereby mechanically connected together in the first and third to twelfth embodiments. The axially stacked steel sheets are caulked to be thereby mechanically connected together in the second embodiment. However, rivets or an adhesive agent may be used to connect the steel sheets, instead.

The metal boss body 33 is fitted into the resin boss 32 of the frame 29 in the foregoing embodiments. However, the molten resin may be poured into the die assembly 46 with the boss body 33 being accommodated in the die assembly so that the boss body may be integrated with the resin boss portion 32, for example, in stead. Further, the boss body 33 may be eliminated, instead. In this case, the resin boss 32 is preferably clamped between the nut 44 and the stepped portion 42 so that the rotor 28 is fixed to the shaft 27.

Figure 21:
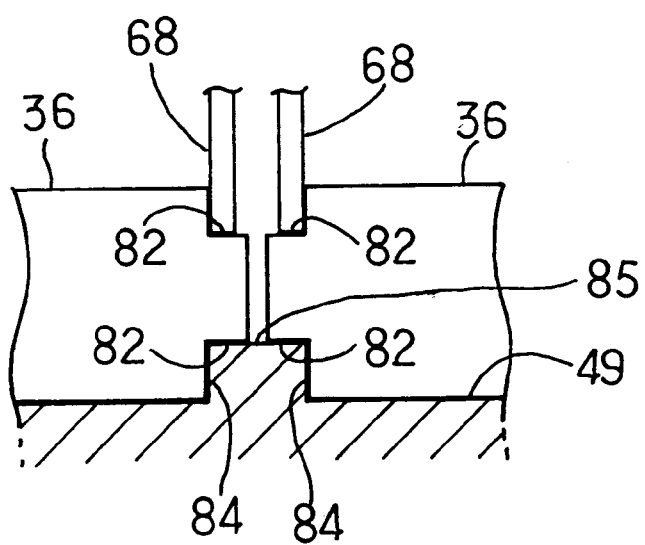
FIG. 21 is a view similar to FIG. 20, showing a twelfth embodiment in accordance with the invention.
Figure 22:
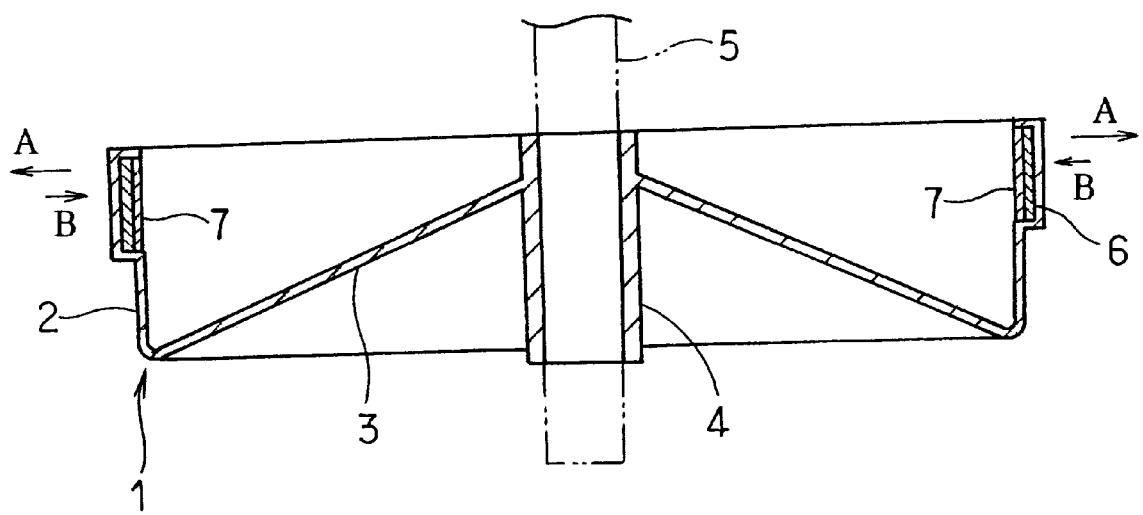
FIG. 22 is a longitudinal section of a conventional rotor.

Although the base 31 of the frame 29 is formed into the flat shape in the foregoing embodiment, it may be formed so as to have a generally V-shaped section, as shown in FIG. 21, instead. Further, although the present invention is applied to the rotor 28 for the brushless DC motor of the outer rotor type in the foregoing embodiments, the invention may be applied to rotors for brushless DC motors of the inner rotor type in which the rotor is rotated inside the stator.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A rotor for an electric motor, comprising:
   a frame made of a resin and having a cylindrical yoke mounting portion, a base covering one end side of the yoke mounting portion, and a shaft supporting portion located at a center of rotation of the base, the yoke mounting portion, the base and the shaft supporting portion being formed integrally with the frames;
   a rotor yoke provided on the yoke mounting portion and substantially divided into a plurality of unit yokes; and
   a plurality of rotor magnets provided on the yoke mounting portion along the rotor yoke.

2. The rotor according to claim 1, wherein the number of the unit yokes is equal to that of divisors obtained by dividing a number of teeth of a stator by a number of phases of stator coils, the divisors excluding 1.

3. The rotor according to claim 1, wherein the number of the unit yokes is 3 or 6.

4. The rotor according to claim 1, wherein each unit yoke has two circumferential ends each of which is adjacent to a circumferential end of a neighboring unit yoke with a space therebetween, and the rotor magnets include some magnets which have a circumferential central portion opposed to the space between the adjacent ends of the unit yokes.

5. The rotor according to claim 1, wherein the rotor yoke has slits substantially dividing it into the plurality of the unit yokes.

6. The rotor according to claim 5, which further comprises a magnetic sensor provided at an axial end side of the rotor yoke, and wherein each of saids slit has one closed axial end opposed to the magnetic sensor.

7. The rotor according to claim 1, wherein each unit yoke is formed by mechanically connecting a plurality of axially stacked magnetic sheets.

8. The rotor according to claim 7, wherein each of said magnetic sheets has a connecting portion opposed to a circumferential central portion of the rotor magnet.

9. The rotor according to claim 1, wherein each of said unit yokes has two circumferential end faces each of which includes a plurality of divided faces and at least one stepped portion.

10. The rotor according to claim 1, wherein each of said unit yokes has two circumferential ends each of which is formed with a notch having an open axial end and an open circumferential end.

11. The rotor according to claim 1, wherein the frame has a window through which a surface of each of said unit yokes is exposed outward.

12. The rotor according to claim 1, wherein each of said unit yokes is formed by caulking a plurality of axially stacked magnetic sheets.

13. The rotor according to claim 12, wherein each of said magnetic sheet includes a outer larger diameter portion having a larger outer diameter than the other outer circumferential face thereof, and the magnetic sheets are caulked at the outer larger diameter portions.

14. The rotor according to claim 12, wherein each of said magnetic sheet includes an inner larger diameter portion having a larger inner diameter than the other inner circumferential face before the magnetic sheets are caulked, and the magnetic sheets are caulked at the inner larger diameter portions.

15. The rotor according to claim 1, wherein each of said unit yokes has two circumferential ends each of which is overlapped on one of the circumferential ends of adjacent of said unit yokes.

16. The rotor according to claim 1, wherein each of said unit yokes has two circumferential ends formed with a convex portion and a concave portion respectively, and the convex and concave portions of each unit yoke are engaged with the concave and convex portions of respective adjacent of said unit yokes when the unit yokes are arranged in a circle so that both circumferential ends of each said unit yoke are adjacent to the circumferential ends of neighboring unit yokes respectively and are radially spread.

17. The rotor according to claim 1, wherein each of said unit yokes has two circumferential ends having notches in upper or lower edges respectively.

* * * * *